(No Model.)  7 Sheets—Sheet 1.

E. T. & D. HIGHAM.
VELOCIPEDE.

No. 305,925. Patented Sept. 30, 1884.

WITNESSES:
John E. Barker
James F. Tobin

INVENTORS
Enos T. Higham
and
Daniel Higham
by their Attys
Hodson & Sons (No Model.) 7 Sheets—Sheet 2.

E. T. & D. HIGHAM.
VELOCIPEDE.

No. 305,925. Patented Sept. 30, 1884.

WITNESSES:
John E. Parker
James F. Tobins

INVENTORS
Enos T. Higham
Daniel Higham
by their Attys.
Howson & Sons (No Model.)  7 Sheets—Sheet 4.
E. T. & D. HIGHAM.
VELOCIPEDE.
No. 305,925. Patented Sept. 30, 1884.

FIG. 10.

WITNESSES:
John E. Parker
James F. Tobin

INVENTORS
Enos T. Higham
Daniel Higham
by their Atty
Hobson & Sons (No Model.)  7 Sheets—Sheet 5.
E. T. & D. HIGHAM.
VELOCIPEDE.

No. 305,925. Patented Sept. 30, 1884.

WITNESSES:
John E. Parker
James T. Tobin

INVENTOR:
Enos T. Higham
and
Daniel Higham
by their attys.
Howson & Sons (No Model.)

E. T. & D. HIGHAM.
VELOCIPEDE.

No. 305,925. Patented Sept. 30, 1884.

FIG. 13.

WITNESSES:
John E. Parker
James F. Tobin

INVENTORS
Enos T. Higham
Daniel Higham
by their attys.
Howson & Sons (No Model.) 7 Sheets—Sheet 7.

E. T. & D. HIGHAM.
VELOCIPEDE.

No. 305,925. Patented Sept. 30, 1884.

WITNESSES:
John E. Parker
James F. Tobin

INVENTOR:
Enos T. Higham
and
Daniel Higham
by their attys.
Dawson & Sons

UNITED STATES PATENT OFFICE.

ENOS T. HIGHAM AND DANIEL HIGHAM, OF PHILADELPHIA, PA., ASSIGNORS OF ONE-THIRD TO EDWARD P. BURTON, OF SAME PLACE.

VELOCIPEDE.

SPECIFICATION forming part of Letters Patent No. 305,925, dated September 30, 1884.

Application filed January 17, 1884. (No model.)

*To all whom it may concern:*

Be it known that we, ENOS T. HIGHAM and DANIEL HIGHAM, citizens of the United States, and residents of Philadelphia, Pennsylvania, have invented certain Improvements in Velocipedes, of which the following is a specification.

Our invention consists of certain improvements in the frame-work, wheels, speed-changing gear, equalizing mechanism, and seat-supporting devices of the velocipede, our improvements being too fully set forth hereinafter to need a detailed preliminary description.

In the accompanying drawings, Figure 1, Sheet 1, is a side view of our improved velocipede; Fig. 9, Sheet 2, a sectional view of part of the frame.

The velocipede is of the character known as a "quadricycle," having four wheels—two on each side. A serious objection to velocipedes of this class, and also to tricycles as usually constructed, is their size, which renders it inconvenient if not impossible to take them indoors after use. To overcome this objection we so construct the frame of the velocipede that it can be readily taken apart after use, and as readily put together again when required. Each pair of wheels ("pair" in this case meaning the large wheel A and small wheel $a$ on each side) is carried by a frame, B, the hub of the wheel A consisting of a sleeve, $b$, carrying opposite disks, C C, to which the inner ends of the spokes are secured, as described hereinafter, said sleeve being free to turn in bearings in the frame B, and the latter having at the front end a pivoted post, $d$, forked at the lower end for the reception of the small wheel $a$, which is free to turn on a short axle carried by said forked post, or with a spindle turning in bearings therein, the upper end of the post having an arm, $e$, connected by a rod, $e'$, to an arm, $e^2$, on a steering-bar, D, free to turn in lugs on the frame B. Each frame B, with its wheels and steering-gear, thus forms an independent self-contained structure, which can be readily slipped laterally onto or off of the projecting ends of the axle F, set-screws $f$ serving to secure the wheel to the axle when necessary, and one of said screws being adapted to an annular groove, $f'$, in the axle, so as to prevent lateral displacement of the wheel. The axle is made in two parts, so that the wheels can turn independently of each other, (a necessity in turning curves,) and this two-part axle carries the tubular rear bar, $g$, of the fixed frame G of the velocipede, the pendent front portion of said frame comprising the opposite legs $h$ and cross-bar $h'$.

In the legs $h$ are formed bearings for the crank-shaft H, and the frame G is supported by means of a wire rope, rod, chain, or suitable connection, $i$, extending from the cross-bar $h'$ to the front end of each frame B, to which it is hooked or otherwise secured, so as to be readily detachable therefrom. The seat K is carried by a post, I, which is secured to and projects upward from the tubular rear bar, $g$, of the frame G, so that the velocipede comprises in effect three main parts—namely, the axle with its frame G carrying the driving-gear, and seat, and the two opposite frames, B, each with its wheels and steering-gear, these frames being readily disconnected, so that when the velocipede is not in use it can be taken apart and stowed away indoors in any convenient place, the frames being connected with equal readiness when the velocipede is again required for use.

Figure 10:
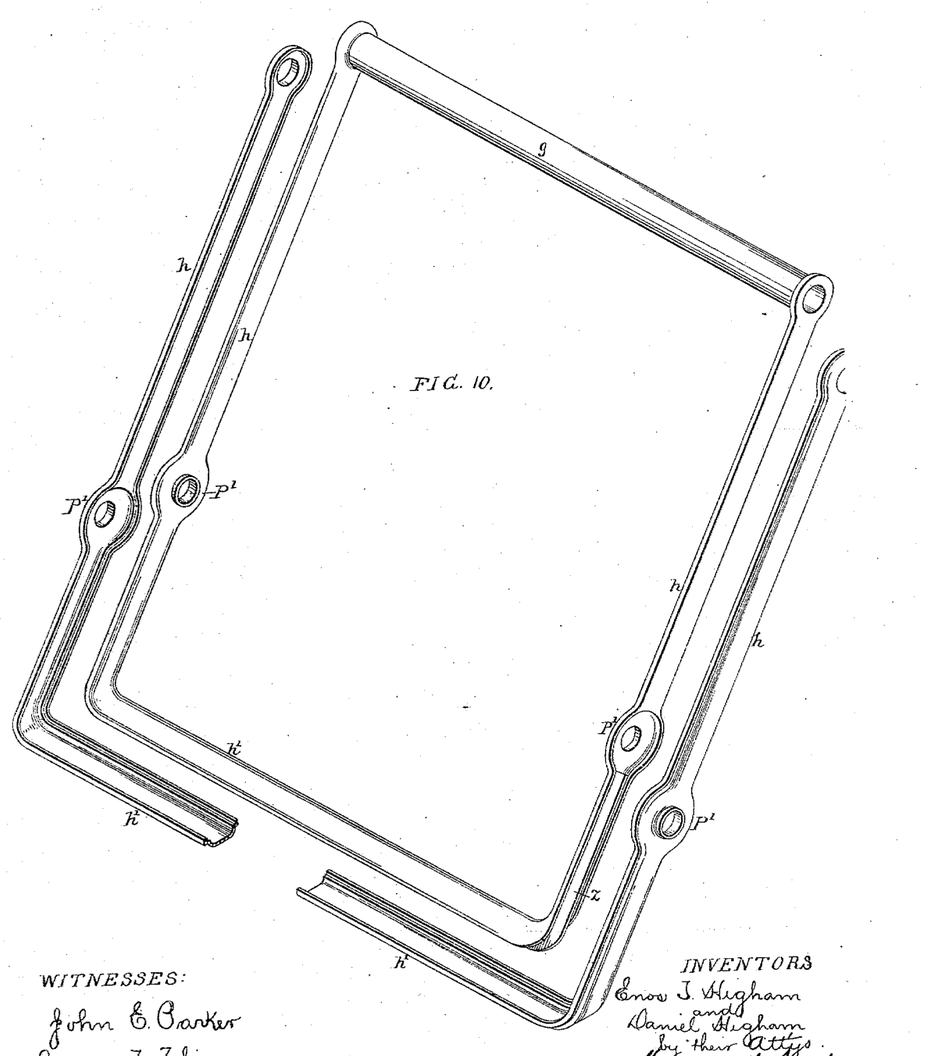
Fig. 10, Sheet 4, a perspective view of the frame.
Figure 11:
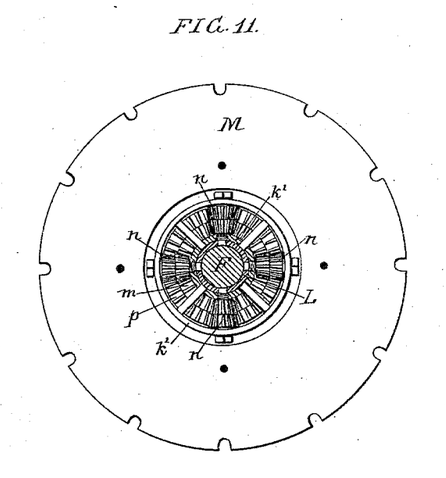
Fig. 11, Sheet 5, a face view of the speed-changing gear.

Secured to each half of the axle F is a bevel-wheel, $m$, which is geared by means of a series of duplex pinions, $n$, (four in the present instance,) to a bevel-wheel, $p$, formed within the hollow hub of a chain-wheel, M, the pinions being carried by radial shafts $k$, braced at their inner and outer ends by rings $k'$, Fig.

10, which are connected by radial spokes and form, in effect, a steadying-frame, whereby the shafts $k$ are always kept at a proper distance apart. The inner ends of the shafts $k$ are screwed into the inner ring, $k'$, and project beyond the same and into openings in a sleeve, L, surrounding the axle; or, if desired, the shafts may be screwed into this sleeve as well as into the inner ring, $k'$.

In a box, $q$, on the tube $g$ of the frame G is guided a bolt, $q'$, which is acted upon by a spring, $q^2$, and has a yoke, $q^3$, capable of being lifted by a cord or other means, and in the sleeve L is an opening for the reception of this bolt, so that the sleeve can be locked to the tube $g$ and prevented from turning; or on elevating the bolt the sleeve may be permitted to turn with the axle F. When the sleeve is prevented from turning, the shafts $k$ are held rigidly in position, and the power is transmitted from the bevel-wheel $p$ to the wheel $m$ of the axle through the medium of the duplex pinions $n$, which turn on the shafts $k$, the speed of the wheel A in this case being greater than that of the chain-wheel M, owing to the difference in the diameters of the wheels $m$ and $p$. When the sleeve L is free to turn, however, the shafts $k$ turn with the same, and the pinions $n$ in this case serve simply to lock the wheels $m$ and $p$ together, both the wheels A and M turning at the same speed. The wheel M is made in two parts, $s\ s'$, separable laterally, the hollow hub of the wheel inclosing the wheel $m$, the pinions $n$, their shafts $k$, and the steadying-frame. The chain-wheels M are driven from the crank-shaft H through the medium of chains Q, passing round said wheels M, round lower chain-wheels, N, and over pulleys N' hung to studs on the frame G, these pulleys N' being so arranged in respect to the chain-wheels M that the chains pass in a vertical direction between the two.

Figures 6, 7:
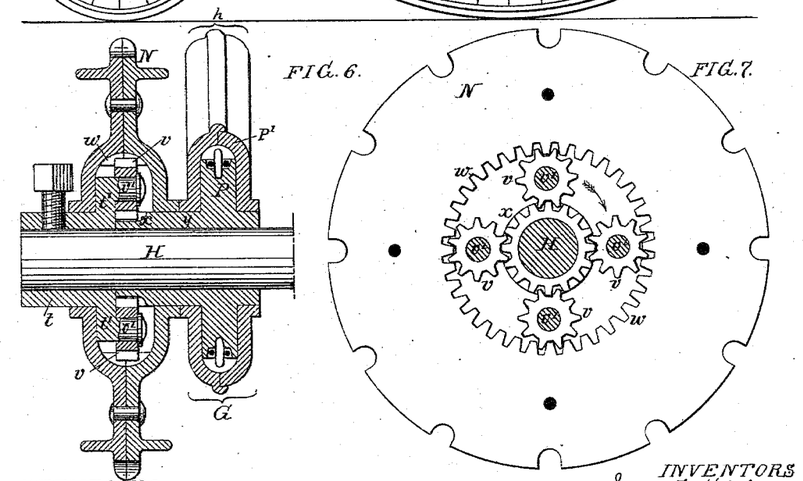
Figs. 6 and 7, Sheet 1, and Fig. 8, Sheet 2, views of parts of the equalizing-gear.

We have found that when the driving-gear is thus constructed and arranged on a frame, G, projecting in advance of the axle F, and the seat K carried by said frame is also located so that the weight or the greater portion of the weight of the rider is in advance of the axle, the power can be applied in the most effective manner, the weight of the rider materially assisting in the application of power. For instance, if the wheels A are held and prevented from turning, the application of power to the crank-shaft will result in raising the frame G at the outer end, and this is resisted by the weight of the rider, which tends to keep the frame G depressed; hence the application of power to the driving-gear is most effective when most required. Spur-gearing may be substituted for the chain-gearing shown; but the latter is preferred. The chain-wheels N are not connected directly to the crank-shaft H, but are driven therefrom through the medium of the devices shown in Figs. 6, 7, and 8.

Figures 8, 9:
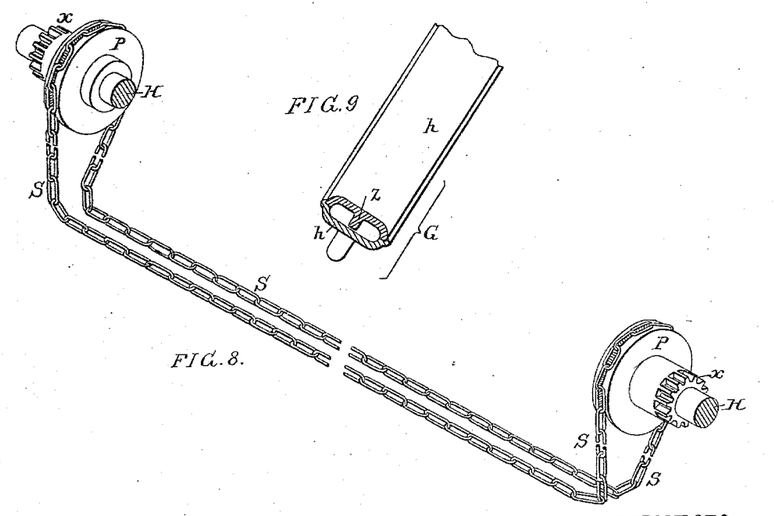

Secured to each end of the crank-shaft H is a hub, $t$, with arms $t'$, (four in the present instance,) these arms carrying pinions $v$, which engage with an internal rack, $w$, in the hub of the chain-wheel N, and with a spur-wheel, $x$, formed on the end of a sleeve, $y$, which is free to turn loosely on the shaft H, and has a chain-wheel, P, contained within an enlargement, P', in one of the legs $h$ of the frame G, the chain S connecting the opposite wheels P, as shown in Fig. 8, and passing through the lower portions of the legs $h$ and through the bottom bar, $h'$, of the frame G, these portions of said frame being hollow and provided with a central partition, $z$, Figs. 9 and 10, to prevent the chain from becoming entangled. When the sleeves $y$ are prevented from turning, the pinions $v$, as they are carried round by the arms $t'$ carry the chain-wheels N with them, owing to their engagement with the racks $w$, the pinions also turning on their pins $v'$, owing to their engagement with the fixed spur-wheels $x$, and thus imparting an additional movement to the chain-wheels. If the central spur-wheel is caused to move in the same direction as the crank-shaft, the speed of the chain-wheel will be reduced to a degree dependent upon the speed of the spur-wheel, a movement of the latter in the opposite direction having the opposite result.

When the velocipede is running in a straight course, both wheels meet with the same amount of resistance, and consequently both sets of driving-gear will have the same speed; but in turning curves the inner wheel will meet with the most resistance; hence, as the pinions $v$ on that side are carried around in the direction of the arrow they will cause the spur-wheel $x$ to turn in the same direction, the resistance to this movement being less than that offered by the rack $w$. This movement of the spur-wheel will be transmitted through the medium of the sleeve $y$, chain-wheels P, and chain S to the opposite sleeve and spur-wheel, the effect of which will be to turn said spur-wheel backward, and thus impart an increased speed to the outside wheel, as is necessary in order to turn the curve, the amount of increase being dependent upon the amount of retardation of the inner wheel, and this upon the sharpness of the curve—in other words, a certain amount of movement will be taken from the inner wheel and added to the outer wheel.

Spur or bevel gearing may be used instead of the chain and chain-wheels for connecting the sleeves $y$; but the chain-gearing is preferred.

The standard I, which carries the seat K, has at the upper end an arm, K', terminating at the outer end in a ring, K², to which are bolted, by means of rings K³, two disks, W, of rubber or other elastic material, a central washer, W', being interposed between the disks and the seat K, bearing centrally upon the disks and being secured by bolts which pass through a flange of the seat, through the washer W', and through a bottom washer, W². By this means an annular elastic support for the seat is formed and the comfort of the rider is enhanced. A single disk of rubber, or more than two disks, may be used, if desired.

Figure 12:
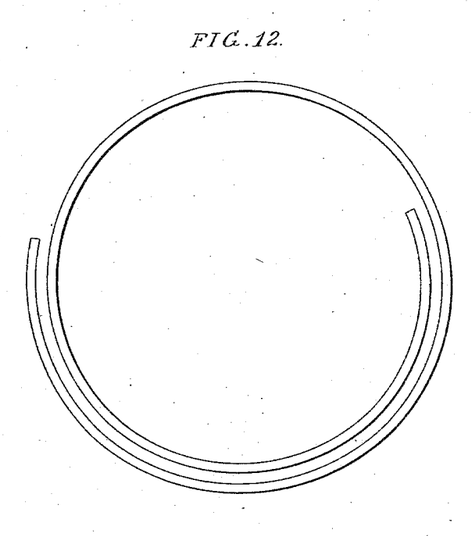
Fig. 12, a view of one of the rubber tires before it is applied to the wheel.

An ordinary rubber tire for velocipede-wheels is, when vulcanized, usually in the form of a ring of the same diameter as the wheel to which it is to be applied. As the periphery of this ring is of greater diameter than its inner edge, the rubber at the periphery is in a constant state of tension, and when it becomes cut the tendency of the incision is to spread and increase in depth. To overcome this objection, we vulcanize the tire while it is in the form of a coil, as shown in Fig. 12, the diameter of the coil being less than the diameter of the wheel. When the coil is expanded so as to adapt it to the grooved tire of the wheel, the effect will be to compress the periphery of the strip, this compression being such as to tend to close any incision that may be made in the tire after its application to the wheel.

Figure 1:
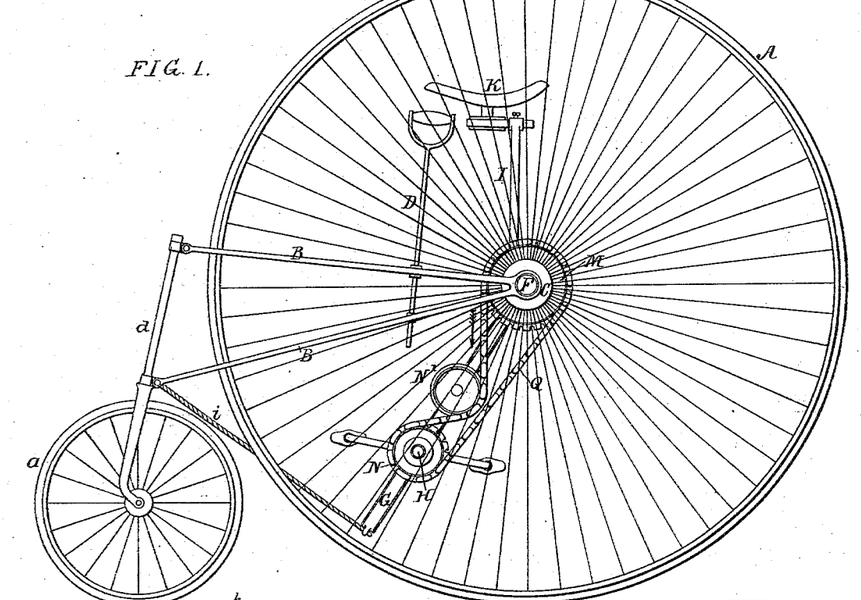
Figure 2:
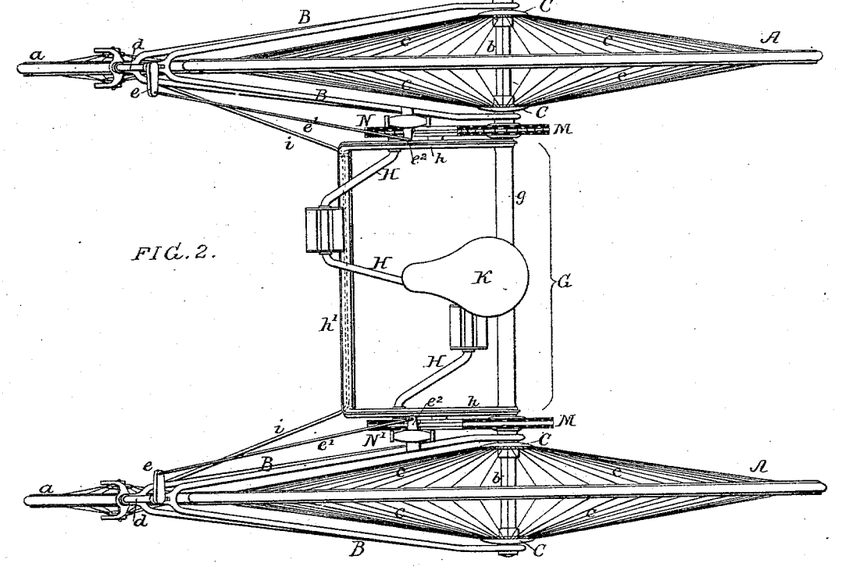
Fig. 2, Sheet 2, a plan view of the same.
Figures 3, 4, 5:
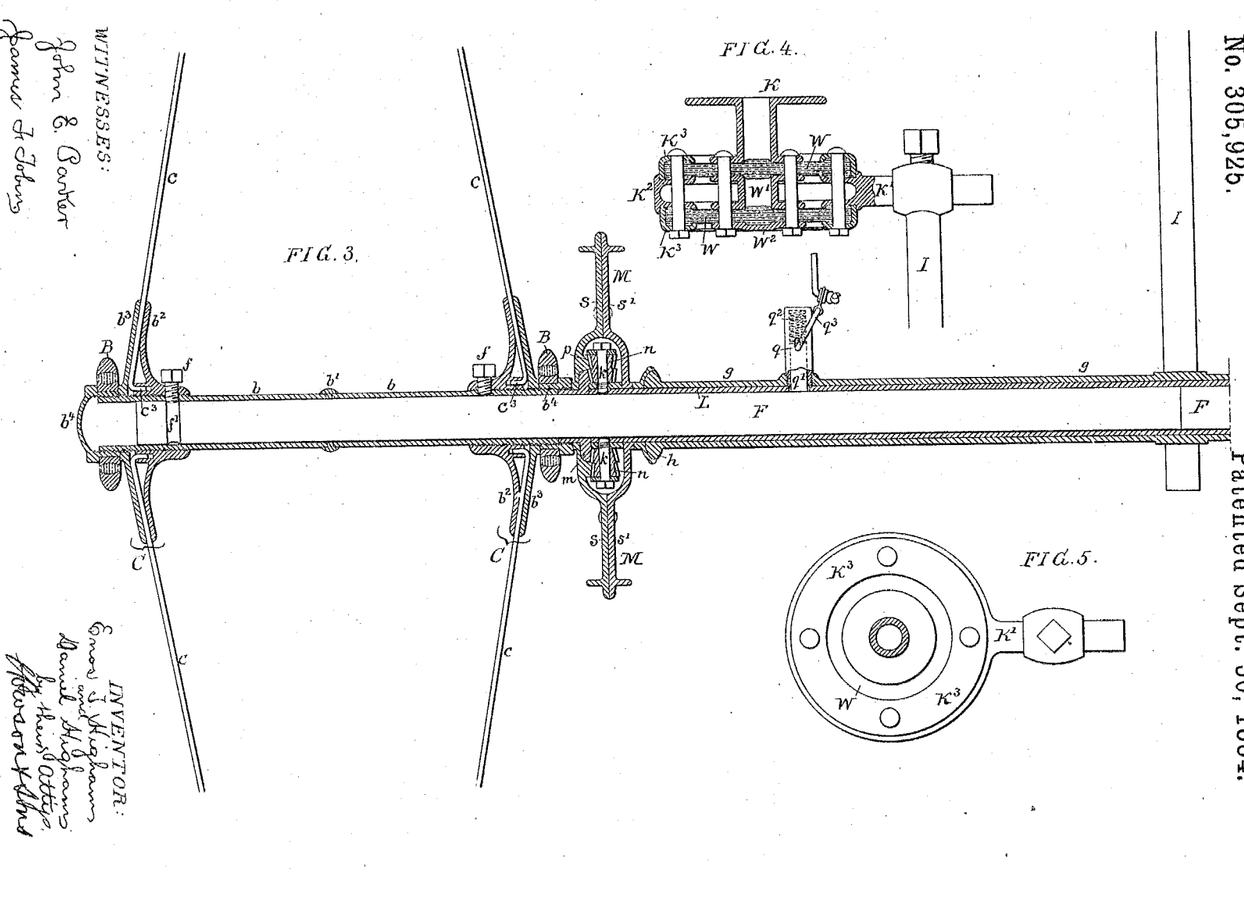
Fig. 3, Sheet 3, an enlarged section of part of the frame, main axle, and one of the wheels.
Figs. 4 and 5, views of the device for supporting the seat.
Figure 13:
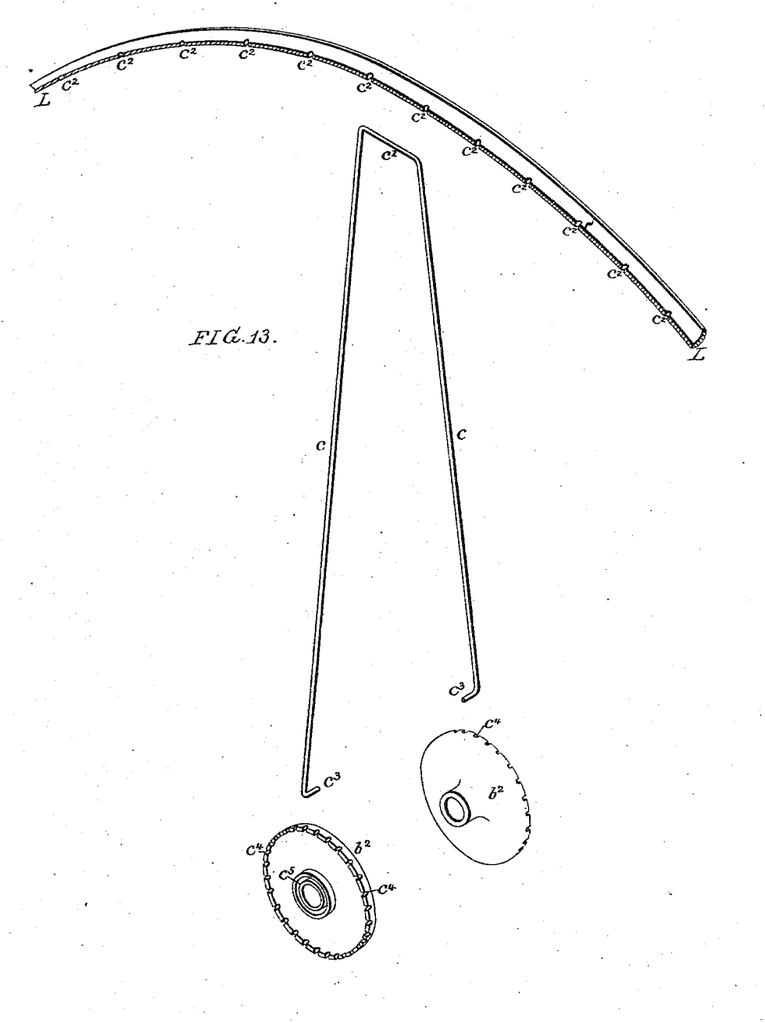
Fig. 13, Sheet 6, a sectional perspective view illustrating the manner of constructing and applying the spokes of the wheel, and Figs. 14 and 15, Sheet 7, views showing a modification of the equalizing gear.

The manner of securing the spokes to the hub and felly of the wheel A is shown in Figs. 3 and 13. On reference to Fig. 3, it will be observed that the sleeve $b$ is made in two parts, bearing centrally upon a ring, $b'$, and each threaded at the outer end. Each disk C of the hub is composed of two plates, $b^2$ and $b^3$, the inner plate, $b^2$, having a central threaded opening adapted to the threaded end of the sleeve $b$, but the outer plate, $b^3$, being free to slide on the sleeve, and being acted upon by a nut, $b^4$, which forms the journal of the wheel, and is adapted to the bearing in the frame B. The spokes $c$ are in pairs, each pair of spokes consisting of a wire bent to form a loop, $c'$, at the outer end, and having at the inner ends hooks $c^3$. The tire L has openings $c^2$, properly spaced for the passage of the spokes, the loop $c'$, connecting each pair of spokes, being within the hollow tire. The inner plate, $b^2$, of each of the hub-disks C has a notched rim, $c^4$, for receiving the spokes, and an annular groove, $c^5$, for receiving the hooks at the ends of the spokes, the end of one spoke of each pair being secured to one disk C, and the end of the other spoke to the opposite disk. The spokes are all of exactly the same length, and the tire is made true before the application of the spokes thereto. The inner ends of the spokes are applied to the plates $b^2$, and clamped thereto by the plates $b^3$ of the disks C while said disks are at the center of the sleeve $b$, the disks being then separated so as to bring the plates $b^2$ under control of the threaded ends of the said sleeve, whereupon the halves of the sleeve are rotated, so as to force the disks apart, and thus stretch the spokes and make a firm, true, and well-bound wheel.

Speed-changing gear may be used in connection with the crank-shaft instead of the axle, if desired, and the equalizing-gear may be used upon the axle where such an arrangement is preferred. Thus in Figs. 14 and 15 we have shown how the latter idea may be carried into effect. The axle F is continuous, and the pinions $v$ are carried by the chain-wheels M, which are free to turn. Each of the internal racks $w$ is carried by a sleeve, F', to which one of the wheels is attached, and each of the spur-wheels $x$ is carried by a sleeve, $y$, these two sleeves having at their inner ends chain-wheels P, connected by a chain, S, passing over a segmental guide, S', on the fixed frame, so that any rotary movement of one of said sleeves causes a movement of the other sleeve to the same extent, but in the opposite direction.

Figure 14:
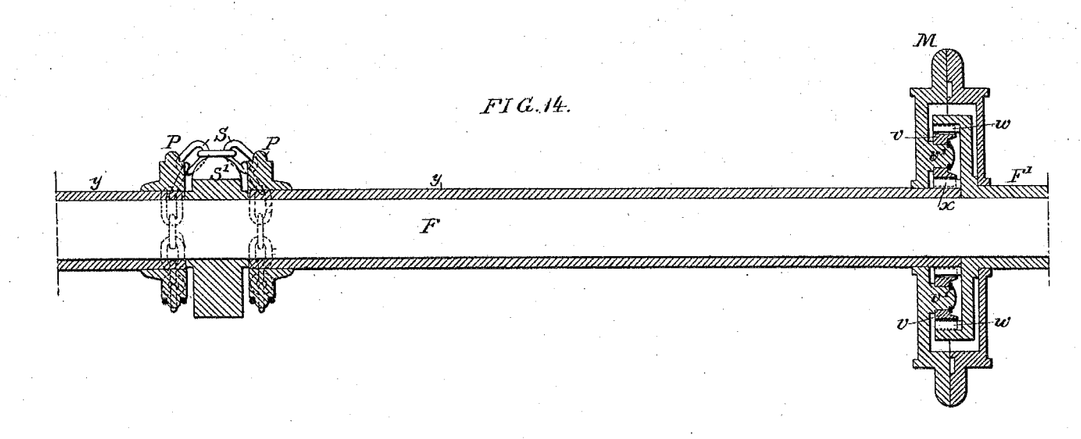
Figure 15:
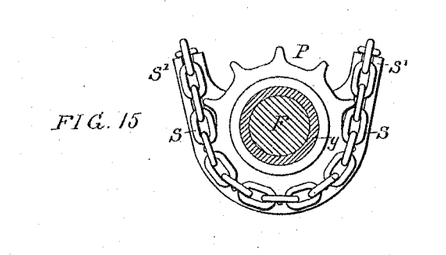

The gearing for one side only is shown, but it will be understood that the opposite side has precisely similar gearing.

We claim as our invention—

1. The combination, in a velocipede, of an axle, a seat-frame, and driving-gear with opposite detachable frames B, each carrying a pair of wheels, as set forth.

2. The combination of the two pairs of wheels A $a$, the axle, the frame G, carrying the seat and driving-gear, and the opposite frames B, detachable from the axle, and each having a bearing for one of the wheels A, a pivoted post for one of the wheels $a$, and steering mechanism for said wheel $a$, as set forth.

3. The combination of the shaft or axle having a bevel-wheel, $m$, the wheel M, having a bevel-wheel, $p$, the connecting-pinions $n$, the shafts $k$, carrying the same, and means for locking and releasing the frame carrying said shafts, as set forth.

4. The combination of the axle and driving-wheels of a velocipede, a frame, G, projecting in front of the axle and carrying the crank-shaft and driving-gear, and a seat, located as described, whereby the preponderance of weight is in front of the axle, as set forth.

5. The combination of the axle and driving-wheels, the frame G, projecting in front of the axle, the seat, located as described, the crank-shaft H, adapted to bearings in the frame G, the chain-wheels N, driven by the crank-shaft, the chain-wheels M, the intermediate pulleys, N', carried by the frame G, and the chains Q, engaging with the wheels M and N and passing under the pulleys N', as set forth.

6. The within-described equalizing device for velocipedes, the same comprising two wheels or disks having internal racks, $w$, and connected or geared one to one driving-wheel and the other to the opposite driving-wheel, the spur-wheels $x$, geared together, so as to move in unison but in opposite directions, the pinions $v$, gearing into the spur-wheels $x$, and racks $w$, and the two pinion-carriers driven by or from the crank-shaft, as set forth.

7. The combination of the two wheels or disks having internal racks, $w$, and connected or geared to the driving-wheels, the sleeves $y$, having spur-wheels $x$ and chain-wheels P, the guided chain S, connecting the two chain-wheels, the pinions $v$, gearing into the spur-wheels $x$, and racks $w$, and the pinion-carriers driven by or from the crank-shaft, as set forth.

8. The combination of the axle, the opposite frames B, carrying the wheels, the frame G, carrying the seat and driving-gear and hung to the axle, and the supporting cord or wire $i$, connected to the frames B and G, as set forth.

9. The combination of a rubber disk clamped at the edge, with a seat, K, centrally supported by said disk, as set forth.

10. A velocipede-wheel having a rubber tire expanded to fit the felly and having its periphery compressed by such expansion, as set forth.

11. The mode described of preparing rubber tires for velocipede-wheels, said mode consisting in vulcanizing the tire, while it is coiled, to a less diameter than that of the wheel, as set forth.

12. The combination of the grooved felly having openings $c^2$ in the bottom, the clamping-disks C of the hub, and the spokes composed of wires, each bent to form a pair of spokes with outer loop, $c'$, and hooked ends $c^3$, the loop resting in the grooved felly, and the hooked ends being adapted to the clamping-disks of the hub, as set forth.

In testimony whereof we have signed our names to this specification in the presence of two subscribing witnesses.

ENOS T. HIGHAM.
DANIEL HIGHAM.

Witnesses:
JOHN M. CLAYTON,
HARRY SMITH.